US006613115B2

(12) United States Patent
Moore (10) Patent No.: US 6,613,115 B2
(45) Date of Patent: Sep. 2, 2003

(54) CARTRIDGE DUST COLLECTOR (76) Inventor: Stephen H. Moore, 415 Buena Vista Rd., Vanderburgh County Evansville, IN (US) 47701

(*) Notice: Subject to any disclaimer, the term of this patent is extended or adjusted under 35 U.S.C. 154(b) by 5 days.

(21) Appl. No.: 09/928,149

(22) Filed: Aug. 10, 2001

(65) Prior Publication Data

US 2002/0020160 A1 Feb. 21, 2002

Related U.S. Application Data (60) Provisional application No. 60/224,769, filed on Aug. 12, 2000.

(51) Int. Cl.[7] ............................................. B01D 46/00
(52) U.S. Cl. ............................ 55/302; 55/283; 55/490; 55/493; 55/521; 95/278; 95/279; 95/280
(58) Field of Search .......................... 55/283, 291, 301, 55/302, 490, 493, 498, 502, 521, 529; 95/273, 278, 279, 280

(56) References Cited

U.S. PATENT DOCUMENTS

| 3,385,034 A | * | 5/1968 | Farr | 55/493 |
| 4,264,345 A | * | 4/1981 | Miller | 55/493 |
| 4,504,293 A | * | 3/1985 | Gillingham et al. | 55/302 |
| 4,955,996 A | * | 9/1990 | Edwards et al. | 55/498 |
| 5,746,796 A | * | 5/1998 | Ambs et al. | 55/493 |
| 5,961,696 A | * | 10/1999 | Gombos | 95/273 |

* cited by examiner

Primary Examiner—David A. Simmons
Assistant Examiner—Minh-Chau T. Pham
(74) Attorney, Agent, or Firm—Gary K. Price, Esq.

(57) ABSTRACT

A cartridge dust collector for maximizing the filtration of the air and removal of the pollutants and contaminants from the air stream. The cartridge dust collector including a housing having an air inlet, an air outlet, and a transverse wall. The housing further including a chamber. Conical shaped dust collector cartridges are mounted in the chamber between the air inlet and the air outlet with each dust collector cartridge in alignment with an access opening in a side wall of the housing. Provided in the housing in alignment with each access opening are spaced apart slide rails. The dust collector cartridges including a conical shaped media pack and a head plate secured to the upper end. Each head plate is carried on the slide rails, with the slide rails being spaced apart sufficiently to receive the media pack there between. Interlocking means are privide on adjacent head plates fo that the cartridges can be assembled and removed from the housing end groups, rather than individually. The cartridge dust collector further including a cammed locking means for securing each cartridge in place and for sealing the top of each dust collector cartridge with respect to the transverse wall.

10 Claims, 7 Drawing Sheets

CARTRIDGE DUST COLLECTOR

CROSS REFERENCES TO RELATED APPLICATIONS

U.S. Provisional Application for Patent No. 60/224,769, filed Aug. 12, 2000 with title, "Cartridge Dust Collector" which is hereby incorporated by reference. Applicant claims priority pursuant to 35 U.S.C. Par. 119(e)(i).

Statement as to rights to inventions made under Federally sponsored research and development: Not Application

BACKGROUND OF THE INVENTION

1. Field of the Invention

This invention relates to a cartridge dust collector, and more particularly, to an improved cartridge dust collector with locking mechanism that seals the cartridges in a row in place for use and with cartridge interlocking head plates for facilitating installation and removal of the cartridges from the cartridge dust collector.

2. Brief Description of Prior Art

Dust collector assemblies have been used to remove pollutants from an air stream in various industrial and commercial applications. Commonly, the dust collector uses cartridges or other media configurations to filter the air stream. When a cartridge is filled with pollutants it is removed from the dust collector and replaced with a new cartridge. Cartridges are generally installed and removed from the dust collector assembly one at a time. The cartridges are generally aligned in rows within the housing. As such it is often difficult to reach the inner most cartridges. This is a relatively slow and laborious process. Further, existing dust collectors fail to properly seal the top of each cartridge within the housing to insure that all air passing through the housing passes through the cartridges for maximizing the filtration of the air and removal of the pollutants and contaminants from the air stream.

As will be seen from the subsequent description, the preferred embodiments of the present invention overcomes these and other shortcomings of prior art.

SUMMARY OF THE INVENTION

The present invention is an apparatus that is a cartridge dust collector comprising a housing, said housing having an air inlet and an air outlet, a chamber, said chamber having access openings, and is defined in part by a transverse plate or wall with said openings therein. Dust collector cartridges are positioned in the chamber in a vertical position in alignment with the access openings in the transverse wall. The cartridges are conical shaped, tapering from top to bottom. Said housing further comprising a pair of parallel slide rails that are in alignment with the access openings. Said cartridges further comprise a head plate and a bottom plate. The head plate of each dust collector cartridge is carried on the slide rails, which are spaced apart sufficiently to receive the cartridge therebetween. Said cartridge dust collector further comprising a sealing gasket, and cammed locking means for securing the cartridges in position in alignment with the openings in the transverse wall. The locking means are releaseable to permit removal of the cartridges from the housing for replacement. Further, the head plates for the dust collector cartridges are provided with interlocking means enabling the cartridges to be removed a row at a time.

DESCRIPTION OF THE PREFERRED EMBODIMENT

Figure 1:
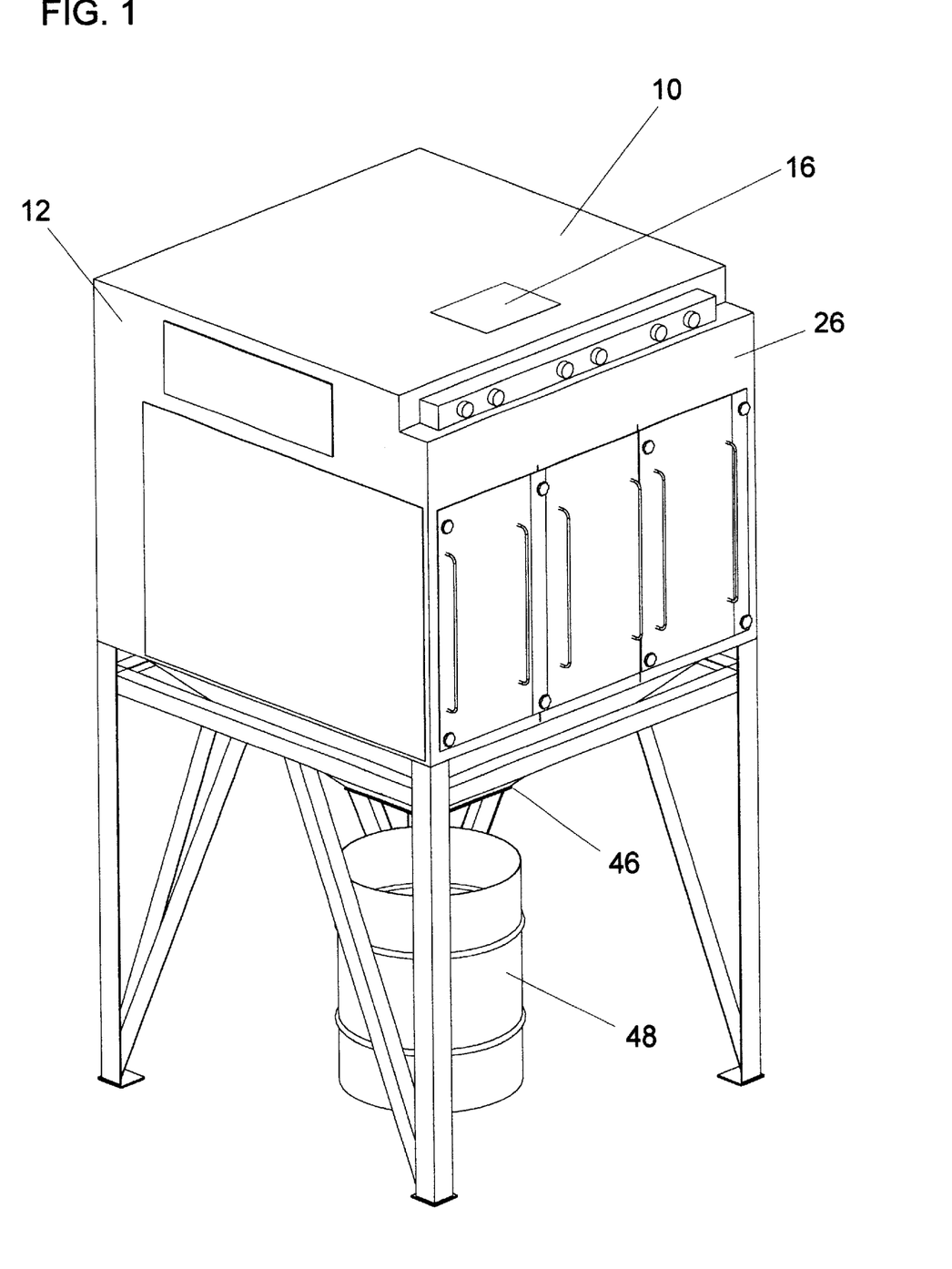
FIG. 1 illustrates a preferred embodiment of the present invention, a cartridge dust collector.
Figure 2:
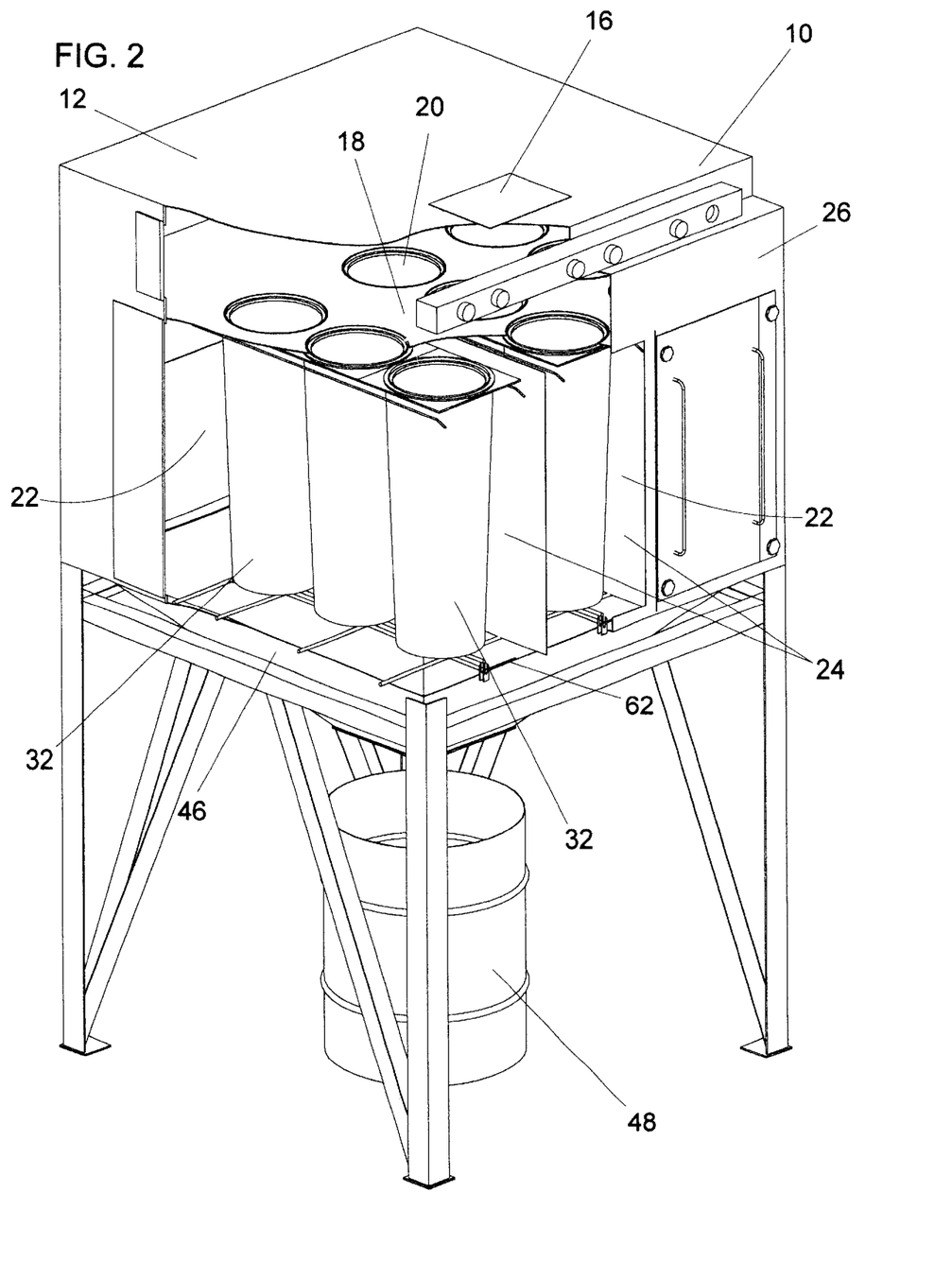
FIG. 2 illustrates the present invention, with the housing removed to show the internal components.
Figure 3:
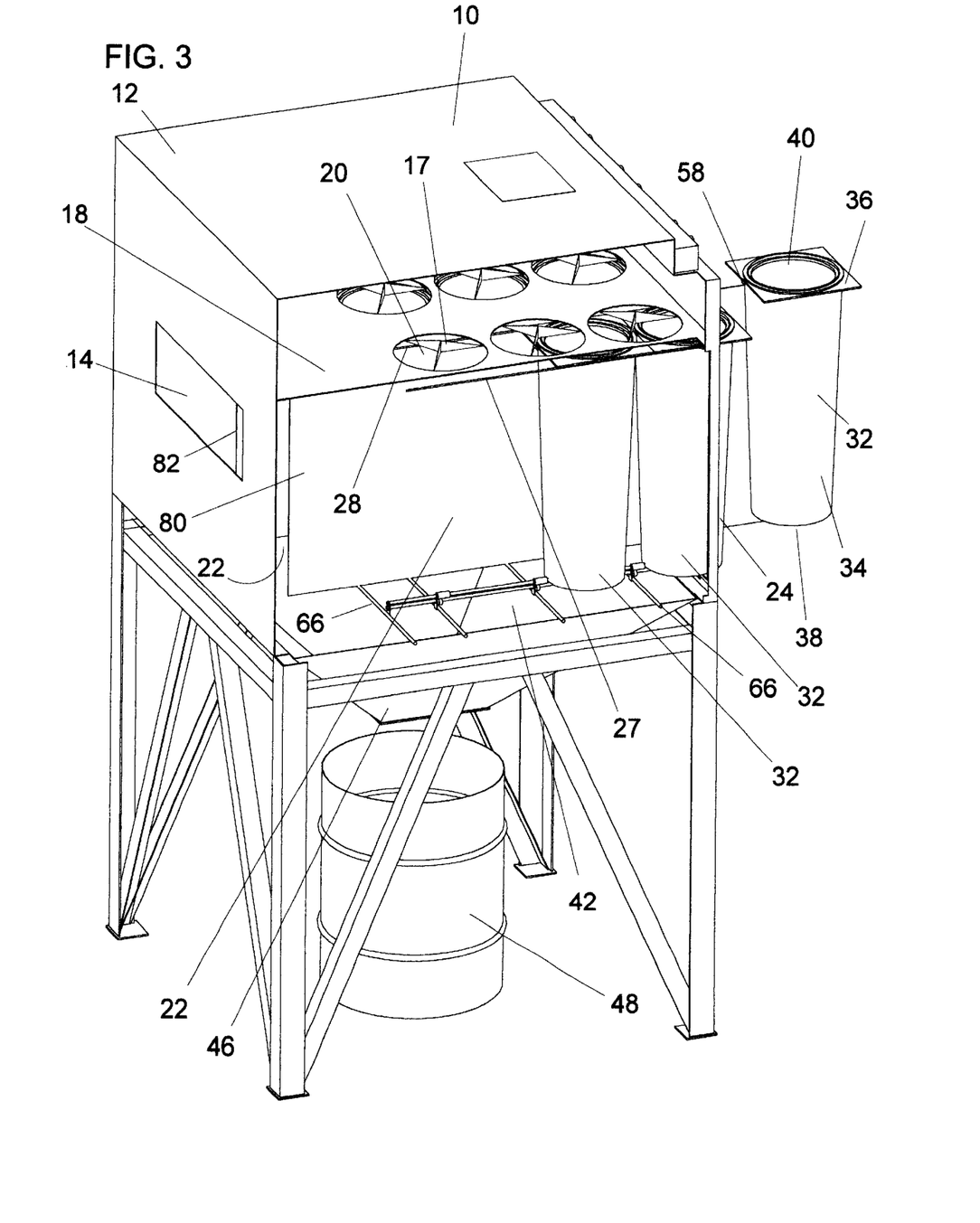
FIG. 3 illustrates the present invention, illustrating more particularly the manner of securing the dust collector cartridges within the housing.
Figure 4:
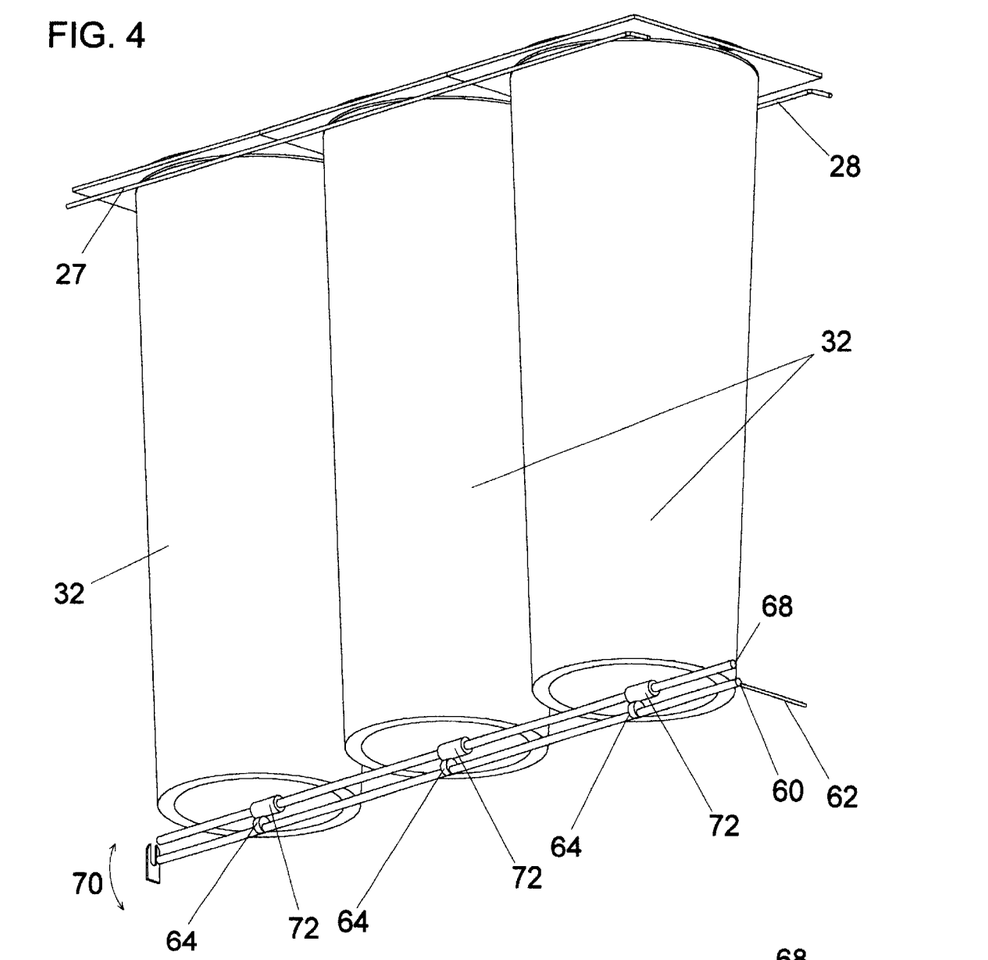
FIG. 4 illustrates the locking means for securing the dust collector cartridges in place, such locking means being shown in the locked position.

FIGS. 1–3 illustrate the preferred embodiment of the present invention, an apparatus that is a cartridge dust collector 10 including a housing 12, said housing 12 having an air inlet 14 (shown in FIG. 3), an air outlet 16 and a first side 26. Said housing 12 further comprising a transverse plate or wall 18 situated within the housing 12, having a plurality of openings 20. An air diverter 17 (shown in FIG. 3) is positioned over each of the openings 20 in the transverse wall 18. A chamber 22 is defined within the housing 12 below the transverse wall 18, and effectively runs the length and width of the housing 12. The chamber 22 includes an access opening 24 in the first side 26 of the housing 12. Secured within said chamber 22 are a pair of parallel slide rails 27, 28. Said slide rails 27 and 28 are spaced apart, and aligned with the access opening 24 of the chamber 22, and adapted to support a row of conical shaped dust collector cartridges 32. Said cartridges 32 comprising a conical shaped media pack 34, a head plate 36 and a bottom plate 38. A sealing gasket 40 is connected to the top of each cartridge 32, said sealing gasket 40 extends above the top of the cartridge 32 and engages the underside of the transverse wall 18 to seal the top of the cartridge 32 with respect to the transverse wall 18. Positioned below the cartridges 32 are cammed locking means 42 for securing the cartridges 32 in place. Said locking means 42 further engages the sealing gasket 40 with the underside of the transverse wall 18, thereby preventing the flow of air between the top of the cartridge 32 and the underside of the wall 18.

As shown in FIGS. 1, 2 and 3, the cartridge dust collector 10 further comprising a hopper 46 positioned beneath the housing 12, and a container 48 positioned beneath the hopper 46.

Figure 10:
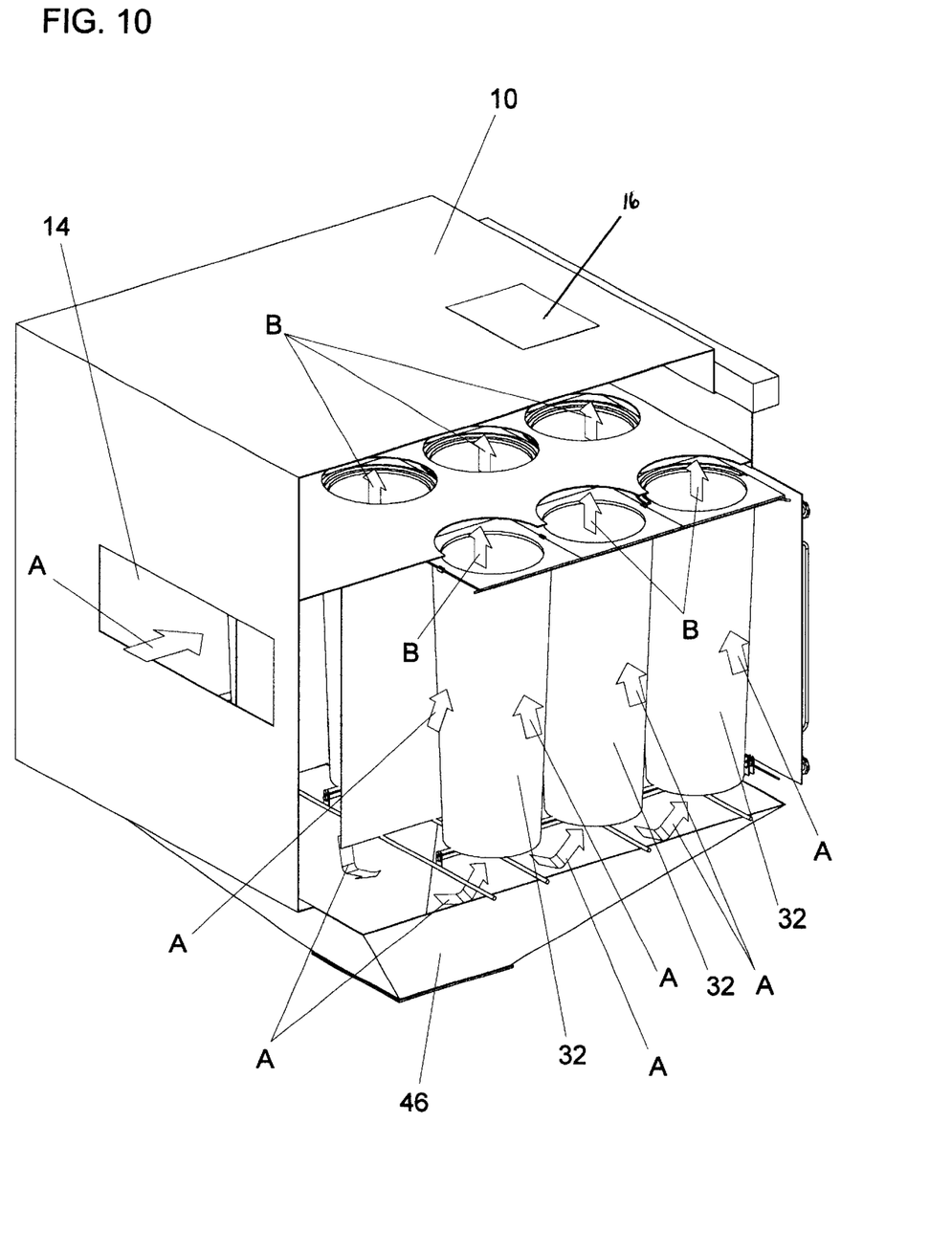
FIG. 10 illustrates the air path through the housing of the cartridge dust collector.

In operation, dirty air enters the chamber 22 of the housing 12 through the air inlet 14. The inlet area of the cartridge dust collector 10 is in effect an expansion chamber defined by walls 80 and 82, shown in FIG. 3. As air enters the air inlet 14 into the inlet area, incoming air velocity is reduced by about one-half. Slower air flow allows higher air-to-media ratios, distributes dirty air across the entire media surface more effectively, and eliminates high-velocity particle impact on the cartridges 32 media for added service life. When air enters the chamber 22 it expands and deflects. Air flow circulates within the chamber 22 and filters up and through the cartridges 32 (shown as arrow A in FIG. 10). Particulate collects on the outer surface of the cartridges 32. Clean air then flows through the openings 20 in the transverse wall 18, and exits through the air outlet 16 (shown as arrow B in FIG. 10).

In the preferred embodiment, the cartridges 32 are conical shaped, tapering from top to bottom. As a result, heavier dust particles on the surface of the cartridge 32 will fall naturally into the hopper 46. While in the preferred embodiment, the cartridges 32 are conical shaped, the cartridge dust collector 10 will also work with cylindrical shaped cartridges.

Figure 8:
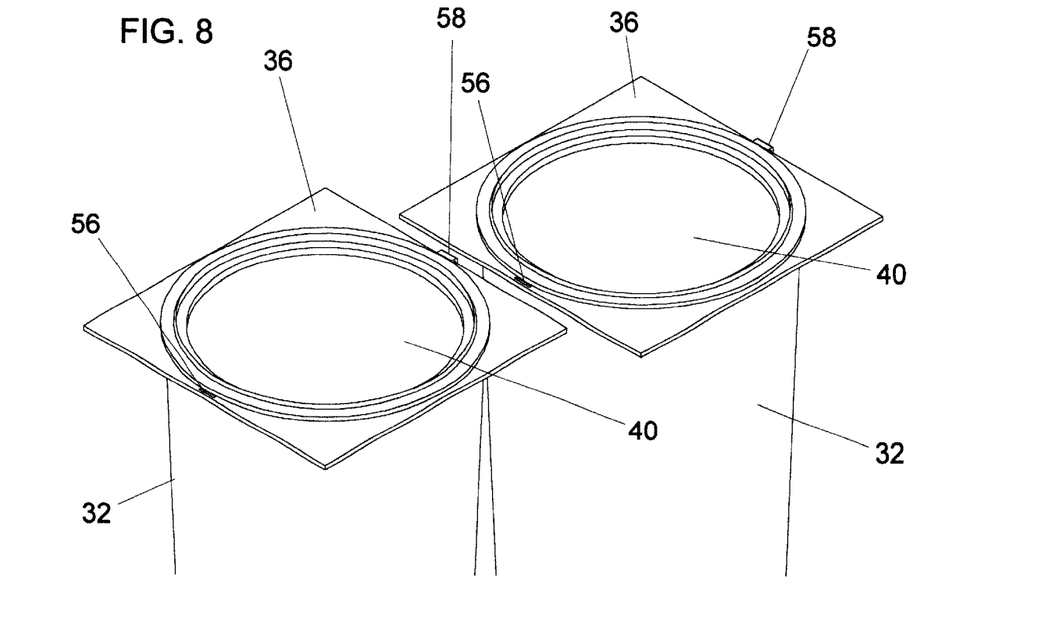
FIG. 8 illustrates a pair of adjacent head plates, and more particularly illustrating the tab and slot interlocking arrangement.
Figure 9:
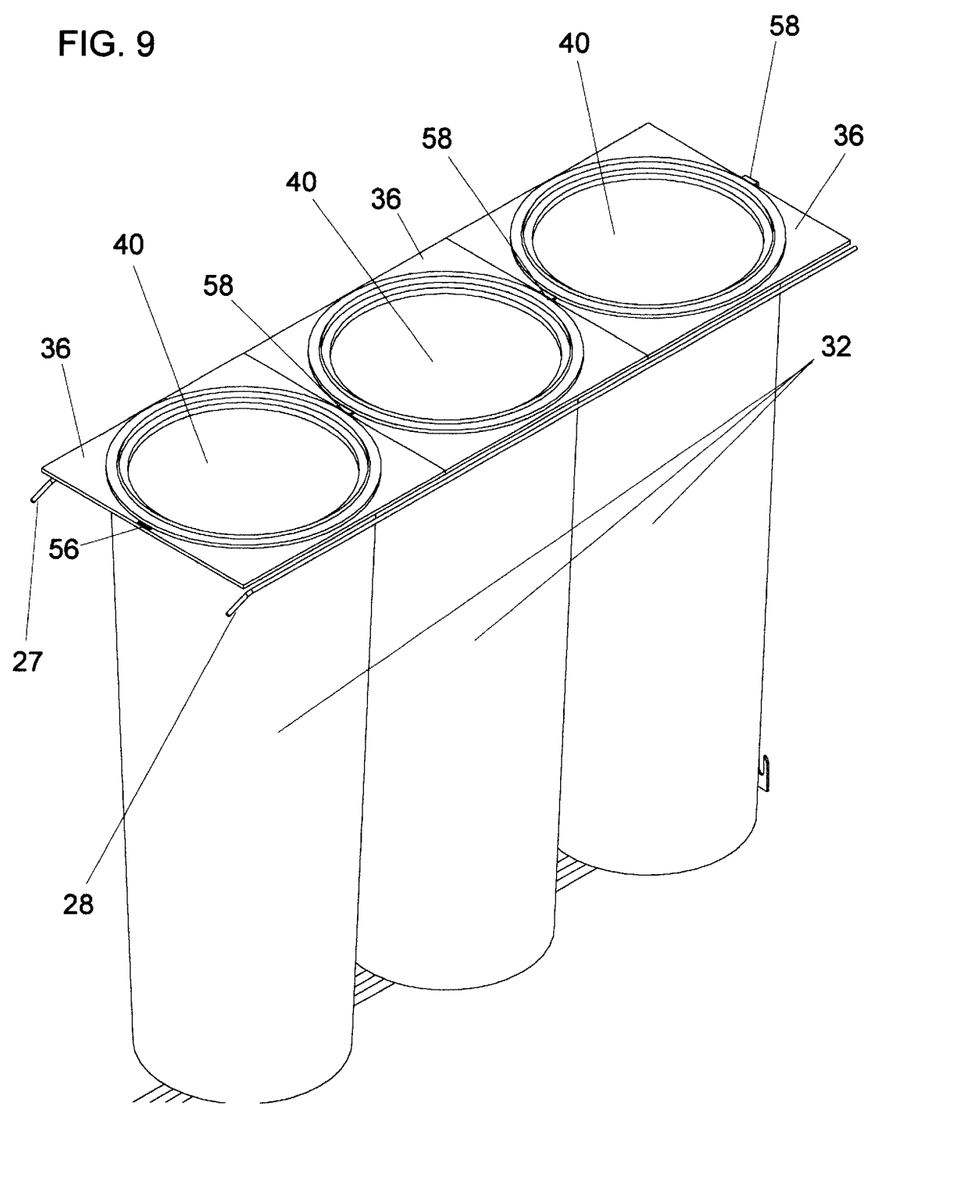
FIG. 9 is a perspective view showing three plates interlocked.

The present invention includes a means of interlocking the cartridges 32, thereby simplifying installation and removal of the cartridges 32 from the housing 12. As shown in FIG. 8 such interlocking means includes inter-engaging slots 56 and tabs 58 on the head plates 36. While such interlocking means could be formed in a number of ways known to those skilled in the art, the described slot and tab arrangement is preferred. The cartridges 32 are installed in the housing 12 by first placing the locking means 42 in the unlocked position as will be discussed, and engaging the head plate 36 of the first cartridge 32 on the slide rails 27, 28 and slide the first cartridge 32 part way into the housing 12. The head plate 36 is slidably carried in the slide rails 27, 28. The tab 58 on the head plate 36 of the next cartridge 32 is engaged in the slot 56 of the first cartridge 32, and the head plate 36 of the said second cartridge 32 is engaged in the slide rails 27, 28. The two cartridges 32 are then interlocked by said slots 56 and tab 58 and slidably urged within the housing 12. As shown in FIG. 9, the tab 58 on the head plate 36 of the third cartridge 32 is engaged with the slot 56 of the head plate 36 of the second cartridge. Once said cartridges 32 are interlocked as described above, such cartridges 32 are slidably pushed inwardly on the rails 27, 28 into the housing 12. When the three cartridges 32 are in position and aligned with the openings 20 in the transverse wall 18, the locking means 42 is actuated to secure the cartridges 32 in position, with the gasket 40 at the top of each cartridge 32 firmly seated against the underside of the transverse wall 18 to preclude air flow between the top of each cartridge 32 and the underside of the wall 18. To remove the cartridges 32, the locking means 42 is actuated to release the cartridges 32. Such interlocking means as described herein not only facilitates installation of the row of cartridges 32 in the housing 12, but is particularly useful in removing the cartridges 32, since pulling upon the outermost cartridge 32 will effectively make accessible the remaining interconnected cartridges 32 in the row.

The locking means 42 includes an elongated actuating rod 60 and an actuating lever 62 secured to both ends (not shown), or one end of the actuating rod 60 as shown in FIGS. 4–7, and an elongated locking rod 68 mounted within the housing 12 below a row of cartridges 32, in cooperation with the actuating rod 60. Said actuating rod 60 is rotatably supported in cams 64 and supports 66 (shown in FIG. 4) secured to the housing 12. The actuating rod 60 is constructed to urge the elongated locking rod 68 up and down as indicated by arrow 70 shown in FIG. 5. The locking means 42 further comprising a plurality of bearings 72, one said bearing 72 for each cartridge 32. Said bearing 72 is mounted to the locking rod 68 and situated centrally beneath the cartridge 32 with which it is associated.

Figure 5:
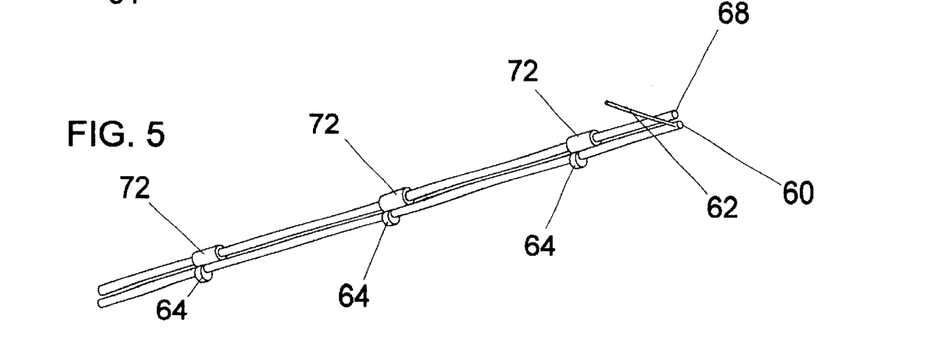
FIG. 5 illustrates the locking means of FIG. 4 in the unlocked position.
Figure 6:
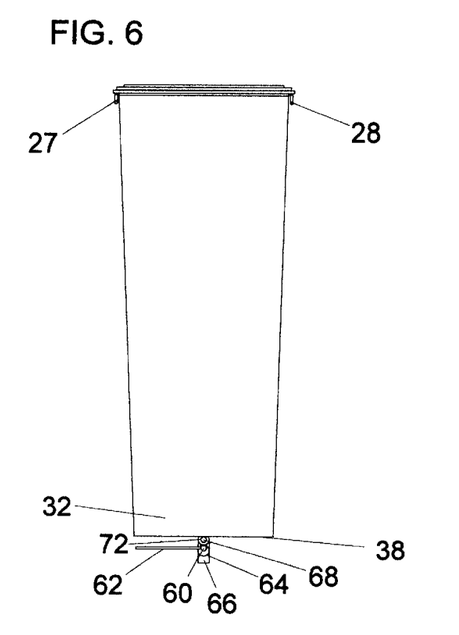
FIG. 6 illustrates a side view of the filter cartridge with the actuating lever in the unlocked position.
Figure 7:
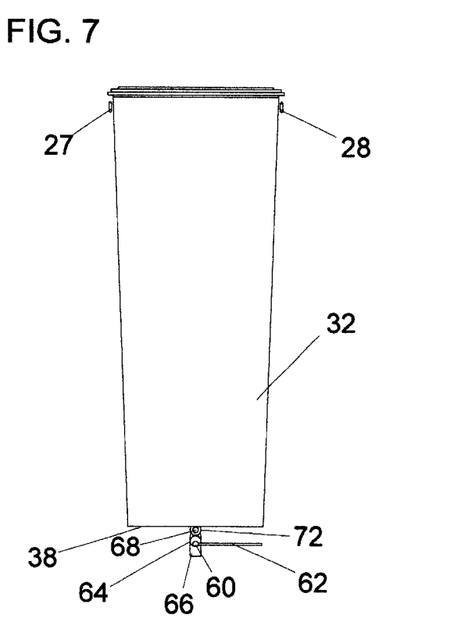
FIG. 7 illustrates a side view of the filter cartridge with the actuating lever in the locked position.

When loading and interlocking the row of cartridges 32 as described above, the lever 62 of the locking means 42 is in the unlocked position as shown in FIGS. 6 and 7. To move the cartridge 32 into the locked position, the lever 62 is moved to a second position, as shown in FIGS. 5 and 8 in order to rotate the actuating rod 60.

The rotation of the actuating rod 60 will urge the locking rod 68 in firm engagement with the bottom plate 38 of the cartridges 32. The locking rod 68 is engaged with the bottom plate 38 of the cartridge 32, and the sealing gasket 40 is urged into engagement with the underside of the wall 18 thereby preventing the flow of air between the top of the cartridges 32 and the underside of the wall 18.

To remove the cartridges 32, the locking means 42 is actuated to release the cartridges 32 and all interconnected cartridges 32 are easily accessible for removal without requiring the user to reach into the housing 12 for the inner cartridges 32. In the unlocked position the locking rod 68 is not engaged with the bottom plate 38 of the cartridge 32.

Locking or unlocking the locking means 42 will simultaneously lock or release each of the cartridges 32 in the row.

Although the description above contains many specificities, these should not be construed as limiting the scope of the invention but as merely providing illustrations of a presently preferred embodiment of this invention.

While the preferred embodiment of the present invention shown in the drawing have three rows of three cartridges in each row, other configurations are feasible within the scope of the invention. For example, more than two rows can be added, including additional guide rails and locking means for each added row. Likewise each row can have more than three cartridges.

Thus, the scope of the invention should be determined by the appended claims in the formal application and their legal equivalents, rather than by the examples given.

I claim:

1. A cartridge dust collector assembly comprising:
   a housing including an air inlet, an air outlet, a first side, a transverse wall within the housing having a plurality of openings, and a chamber defined within the housing and below the transverse wall that effectively runs the length and width of the housing, said chamber including an access opening in the first side of the housing;
   a pair of parallel slide rails secured within the chamber, said slide rails spaced apart and aligned with the access opening of the chamber and supporting a row of dust collector cartridges, each of said dust collector cartridges including a media pack, a head plate, a bottom plate, and a sealing gasket connected to a top end of the dust collector cartridge, each head plate adapted to be slidably carried on the slide rails, with the slide rails being spaced apart to receive the head plate of the cartridge therebetween;
   means for interlocking the cartridges one to the other, said interlocking means including an inter-engaging slot and a tab on each of the head plates, wherein the tab in one head plate engages the slot of an adjacent head plate; and
   a locking means for releaseably securing the dust collector cartridges in position within the housing.

2. The cartridge dust collector assembly as recited in claim 1, wherein locking or unlocking the locking means will simultaneously lock or release the row of cartridges.

3. The cartridge dust collector assembly as recited in claim 1, wherein said cartridge and media pack are conical shaped.

4. A cartridge dust collector assembly comprising:
   a housing including an air inlet, an air outlet, a first side, a transverse wall within the housing having a plurality of openings, and a chamber defined within the housing and below the transverse wall that effectively runs the length and width of the housing, said chamber including an access opening in the first side of the housing;

a pair of parallel slide rails secured within the chamber, said slide rails spaced apart and aligned with the access opening of the chamber and supporting a row of dust collector cartridges, each of said dust collector cartridges including a media pack, a head plate, a bottom plate, and a sealing gasket connected to the top end of the dust collector cartridge, each head plate adapted to be slidably carried on this slide rails, with the slide rails being spaced apart to receive the head plate of the cartridge therebetween; and a locking means including an elongated actuating rod, an actuating lever on at least one end of the rod, said actuating rod is rotatably supported in cams and a support secured to the housing, a plurality of bearings secured to a rotatable locking rod mounted in the housing below the cartridge and cooperating with the actuating rod, so that rotation of the actuating rod will urge the locking rod in firm engagement with the bottom plates of the dust collector cartridges thereby upwardly urging the sealing gasket of the head plates in firm engagement with the underside of the transverse wall in the housing.

5. The cartridge dust collector assembly recited in claim 4, wherein each bearing on the locking rod cooperates with each cam on the actuating rod.

6. The cartridge dust collector assembly as recited in claim 4, wherein locking or unlocking the locking means will simultaneously lock or release the row of cartridges.

7. The cartridge dust collector assembly as recited in claim 4, wherein said cartridge and media pack are conical shaped.

8. A cartridge dust collector assembly comprising:

a housing, a collection chamber defined by said housing and said chamber communicating with an air inlet and an air outlet, at least a first and second filter cartridge each having: a first end with a head plate and a gasket on said head plate and an opening through said head plate defining an exhaust from said chamber, a pair of opposing slide rails disposed within and connected to said collection chamber, said head plates being slidably mounted on said rails to support the first and second cartridge, at least a first and second aperture through a wall of said housing, said first and second apertures located between said rails and being located above said head plates of said first and second filter cartridges, means for aligning said openings through said head plates with said first and second apertures through said wall, means connecting said first cartridge to said second cartridge, means to cam lock said first and second cartridge upward toward said wall to a first position such that said gasket on said head plate forms a seal between said first and second opening, where said means to cam lock can be moved to a second position where said gasket is spaced from said wall and wherein a force applied to slide the first cartridge along said rails will slide the second cartridge as well such that both cartridges can be removed from the housing.

9. The cartridge dust collector assembly as recited in claim 8, wherein said filter cartridge is conical shaped.

10. The cartridge dust collector assembly as recited in claim 8, wherein said filter cartridge is cylindrical shaped.

* * * * *